United States Patent
Chen

(10) Patent No.: US 12,528,239 B2
(45) Date of Patent: Jan. 20, 2026

(54) OIL-ELECTRICITY HYBRID INJECTION MOLDING MACHINE

(71) Applicant: SUZHOU GIENKEE PLASTIC TECHNOLOGY CO., LTD., Suzhou (CN)

(72) Inventor: Minghua Chen, Suzhou (CN)

(73) Assignee: SUZHOU GIENKEE PLASTIC TECHNOLOGY CO., LTD., Suzhou (CN)

( * ) Notice: Subject to any disclaimer, the term of this patent is extended or adjusted under 35 U.S.C. 154(b) by 210 days.

(21) Appl. No.: 18/550,010

(22) PCT Filed: Nov. 25, 2021

(86) PCT No.: PCT/CN2021/133066
§ 371 (c)(1),
(2) Date: Sep. 11, 2023

(87) PCT Pub. No.: WO2022/188463
PCT Pub. Date: Sep. 15, 2022

(65) Prior Publication Data
US 2024/0157615 A1 May 16, 2024

(30) Foreign Application Priority Data
Mar. 11, 2021 (CN) .......................... 202110263907.7

(51) Int. Cl.
*B29C 45/50* (2006.01)
*B29C 45/17* (2006.01)

(52) U.S. Cl.
CPC .. *B29C 45/5008* (2013.01); *B29C 2045/1792* (2013.01); *B29C 2045/506* (2013.01)

(58) Field of Classification Search
CPC .................... B29C 2045/1792; B29C 45/5008
See application file for complete search history.

(56) References Cited

U.S. PATENT DOCUMENTS 5,014,767 A * 5/1991 Ueno .................... B29C 45/531
425/149
6,120,277 A * 9/2000 Klaus .................. B29C 45/5008
425/149
(Continued)

FOREIGN PATENT DOCUMENTS

CN 101695864 A 4/2010
CN 104790022 A * 7/2015
(Continued)

OTHER PUBLICATIONS

Machine translation JP2000176978A (Year: 2000).*
(Continued)

*Primary Examiner* — Abbas Rashid
*Assistant Examiner* — Wayne K. Swier
(74) *Attorney, Agent, or Firm* — Dinsmore & Shohl LLP

(57) ABSTRACT

Disclosed is an oil-electricity hybrid injection molding machine, including a base, a feeding barrel, a screw rod and a power system. The oil-electricity hybrid injection molding machine utilizes a dual clutch combination with coaxial arrangement to enable the use of the same motor for injection and feeding, thereby reducing the selection specifications of the motor; on the other hand, through the use of auxiliary oil cylinders, under the oil-electricity hybrid power, the pressure, speed, and accuracy of the injection can be ensured, especially during injection.

13 Claims, 10 Drawing Sheets

(56) References Cited

U.S. PATENT DOCUMENTS

| | | | | |
|---|---|---|---|---|
| 6,471,904 | B2* | 10/2002 | Klaus | B29C 45/54 |
| | | | | 425/557 |
| 2002/0119211 | A1* | 8/2002 | Bleier | B29C 45/5008 |
| | | | | 425/145 |
| 2004/0013764 | A1* | 1/2004 | Dantlgraber | B29C 45/07 |
| | | | | 425/574 |
| 2004/0109917 | A1* | 6/2004 | Schad | B29C 45/5008 |
| | | | | 425/589 |

FOREIGN PATENT DOCUMENTS

| | | | | | |
|---|---|---|---|---|---|
| CN | 106671345 | A | * | 5/2017 | |
| CN | 207535251 | U | * | 6/2018 | |
| CN | 208067098 | U | * | 11/2018 | |
| CN | 209992287 | U | * | 1/2020 | |
| CN | 112388922 | A | | 2/2021 | |
| CN | 112848160 | A | | 5/2021 | |
| JP | 2000037755 | A | | 2/2000 | |
| JP | 2000176978 | A | * | 6/2000 | B29C 45/5008 |
| JP | 2004243687 | A | | 9/2004 | |
| KR | 20-20160002717 | U | * | 8/2016 | B29C 45/03 |
| WO | WO-2004050325 | A1 | * | 6/2004 | B29C 45/18 |

OTHER PUBLICATIONS

Machine translation WO2004050325A1 (Year: 2004).*
Machine translation CN10479022A (Year: 2015).*
Machine translation KR2020160002717U (Year: 2016).*
Machine translation CN106671345A (Year: 2017).*
Machine translation CN208067098U (Year: 2018).*
Machine translation CN209992287U (Year: 2020).*
Definition of One-way Clutches Kaige Auto Spare Parts Co. LTD> https://www.ggmfg.com/products/couplers-clutches/jaw-clutches.php (Year: 2021).*
Definition of Jaw Clutches G&G Manufacturing Jaw Clutches https://www.ggmfg.com/products/couplers-clutches/jaw-clutches.php. (Year: 2021).*
Machine translation JP2000037755A (Year: 2000).*
Machine translation JP2004243687A (Year: 2004).*
Machine translation CN101695864A (Year: 2010).*
Machine translation CN207535251U (Year: 2018).*

* cited by examiner

OIL-ELECTRICITY HYBRID INJECTION MOLDING MACHINE

CROSS REFERENCE TO RELATED APPLICATIONS

This application is the U.S. National Stage of PCT/CN2021/133066 filed on Nov. 25, 2021, which claims priority to Chinese Patent Application 202110263907.7 filed on Mar. 11, 2021, the entire content of both are incorporated herein by reference in their entirety.

FIELD OF TECHNOLOGY

The present disclosure belongs to the field of injection molding machine, specifically relates to an oil-electricity hybrid injection molding machine.

BACKGROUND

Currently, the all-electric injection molding machine has the following working states:
  injection: the injection motor driving the rotating lead screw to push the screw rod forward;
  holding pressure: holding the pressure of the mold cavity and feeding tube constant for a period of time, during which the injection motor continuing to work;
  feeding: the feeding motor driving the screw rod to rotate (the screw can only rotate in one direction), and when the feeding motor drives the screw rod to rotate, the pressure in the front section of the screw rod will increase, resulting in back pressure, at this time, the ball screw needed to move backwards to release the back pressure, and the feeding motor and injection motor working simultaneously;
  backward loosening (anti flow-casting): after the feeding action is completed, in order to prevent the melt overflow, the injection screw needed to move back a certain displacement.

However, of the vast majority of injection molding machines, each of the injection shaft and feeding shaft is controlled by a servo motor, the injection motor drives the ball screw to rotate through the injection belt, push the screw rod forward and backward; when feeding, the feeding motor drives the screw rod to rotate, in this way, the injection and feeding each require a servo motor (usually the injection servo motor is larger than the feeding servo motor), and throughout the entire injection process, they do not simultaneously produce maximum torque to work (that is, when the output power of the injection motor is maximum, the feeding motor will not produce maximum output at the same time, and vice versa), so the utilization efficiency of the motor is relatively low. Therefore, not only the selection of servo motors increase the cost of injection molding machines, but also the low usage rate of servo motors leads to high injection molding costs.

SUMMARY

The present disclosure relates to an oil-electricity hybrid injection molding machine, comprising:
  a base;
  a feeding barrel, comprising a barrel body with a feeding cavity formed internally and a nozzle arranged at a front end portion of the barrel body, with a plastic raw material inlet arranged on the barrel body;
  a screw rod, extending along a length direction of the feeding barrel and with a rear end portion exposed out of the barrel body;
  a power system, for driving the screw rod to rotate around its axis and/or move rectilinearly along its length direction, in particular, the power system comprises a power motor with an output shaft parallel to the screw rod, an injection unit and a feeding unit coaxially connected to the output shaft through a first clutch and a second clutch, respectively, and an oil pressure auxiliary unit, wherein the first clutch and the second clutch are arranged on the output shaft respectively, and the injection unit is configured to drive the screw rod to move respectively, and the energy accumulator releases energy, and oil is filled into a rodless cavity of the auxiliary oil cylinder.

In one embodiment, the injection unit comprises an injection power component capable of pushing the screw rod to move along its length direction, an injection transmission component connecting the injection power component to the output shaft in a transmission manner, and the first clutch arranged on the output shaft and capable of disengaging and engaging the output shaft and the injection transmission component; the feeding unit comprises a feeding power component connected to the output shaft in a transmission manner and capable of driving the screw rod to rotate, a feeding transmission component connecting the feeding power component to the output shaft in a transmission manner, and the second clutch arranged on the output shaft and capable of disengaging and engaging the output shaft and the feeding transmission component. In this way, the injection or feeding process can be carried out by sharing a power motor.

In one embodiment, the feeding power component and the injection power component are arranged coaxially with the screw rod, and the feeding power component and the injection power component are rotatably arranged relative to each other. In this way, when the corresponding clutch states of the first and second clutches are switched, only one power motor (a servo motor) can work to implement the injection molding of the screw rod, especially during injection molding, the maximum injection pressure is supplied by the servo motor and the auxiliary oil cylinder simultaneously, therefore, the specification of the servo motor is smaller than that of the servo motor of the all-electric injection molding output shaft, which not only reduces the cost of motor specification selection, but also reduces injection molding costs.

In one embodiment, an injection head plate, an injection second plate and an injection tail plate are formed on the base, wherein the feeding barrel and the injection head plate are fixedly connected, the injection second plate is slidably arranged on the base and capable of moving with the screw rod in its length direction, the power motor, the injection unit and the feeding unit are arranged on the injection second plate, and the auxiliary oil cylinder is arranged between the injection second plate and the injection tail plate. In the three-plate arrangement, the installation of the power system has a compact structure, small volume, and easy implementation, and meanwhile, with the assistance of the auxiliary oil cylinder, it is convenient for the implementation of injection and processing, especially during injection, it can accelerate the injection speed of the screw rod at the point the energy accumulator releases energy.

In one embodiment, the feeding power component comprises a feeding transmission shaft coaxial with the screw rod and fixedly connected to the rear end portion of the screw rod, and a feeding belt wheel fixed on the feeding transmission shaft, and the feeding transmission component comprises a feeding transmission wheel connected to the output shaft through the second clutch, and a feeding transmission belt connecting the feeding belt wheel to the feeding transmission wheel in a transmission manner. By synchronizing the feeding belt pulley and the screw rod, it is convenient to accurately control the screw rod state during feeding.

In one embodiment, the injection power component comprises an injection transmission shaft coaxial with and rotatably connected to the feeding transmission shaft, an injection belt wheel fixed on the injection transmission shaft, and a transmission lead screw fixedly connected to the injection transmission shaft, wherein the injection transmission shaft passes through the injection second plate and is rotatably arranged relative to the injection second plate, and the transmission lead screw is connected to the injection tail plate via a fixed plate, and the injection transmission component comprises an injection transmission wheel connected to the output shaft through the first clutch, and an injection transmission belt connecting the injection transmission wheel to the injection belt wheel in a transmission manner. By coaxial connection between the feeding transmission shaft, the injection transmission shaft, and the screw rod, the relative rotation of the feeding power component and the injection power component is achieved.

In one embodiment, the injection unit further comprises an encoder located inside the injection transmission belt and matched with the injection belt wheel and/or the injection transmission belt, and a pressure sensor arranged between the fixed plate and the injection tail plate. In the encoder arrangement, the movement status of the screw rod can be accurately controlled to facilitate the control of injection accuracy.

In one embodiment, the pressure sensor mainly obtains feedback on the screw rod pressure during injection molding and adjusts the injection process accordingly based on the feedback value.

In one embodiment, the feeding process is divided into:
Feeding (I): the servo motor rotates counterclockwise, at this moment, the first clutch (a jaw clutch) is in a disengaged state, and the second clutch (a one-way clutch) backstops to work and drives the screw rod to rotate in place for feeding, and as the feeding action continues, the material at the front end of the screw rod accumulates more and more, generating increasing pressure, and the pressure sensed by the pressure sensor also increases;
Feeding (II): when the pressure sensed by the pressure sensor is greater than a setting value, the rodless cavity of the auxiliary oil cylinder unloads oil through the proportional throttle valve, reducing the backward pressure of the screw rod, at this moment, the auxiliary oil cylinder retracts, the ball screw is driven to rotate counterclockwise, causing the screw rod to retract. When the pressure sensed by the pressure sensor is less than the setting value, the unloading amount of the proportional throttle valve is reduced, and Feeding (I) and Feeding (II) are repeated until the screw rod reaches the next initial injection position, completing the feeding action.

In one embodiment, there are two auxiliary oil cylinders located on opposite sides of the centerline of the screw rod. Under the instantaneous power provided by the energy accumulator, the synchronous movement of the two auxiliary oil cylinders ensures the speed and stability of the injection.

In one embodiment, the above-mentioned base comprises an injection table and pillars located on the injection table, wherein the injection table is square, with four pillars distributed at the four corners of the injection table, and the power system is arranged on the pillars through two injection pull rods extending along the length direction of the screw rod.

In one embodiment, each of the two injection pull rods passes through two pillars located on the same side, the injection head plate, the injection tail plate, and the injection second plate are located between the two injection pull rods, each of the injection pull rods sequentially crosses the injection head plate, the injection second plate, and the injection tail plate on the same side, wherein the injection second plate is slidably arranged on the injection pull rods, and the injection head plate and the injection tail plate are positioned on the injection pull rods are configured that the distance between the injection head plate and the injection tail plate remains unchanged.

In one embodiment, a first rod sleeve is arranged at one end portion of each of the injection pull rods, a second rod sleeve is arranged on the injection pull rod between two pillars on the same side, and an adjuster is provided to drive the injection pull rods to move along their length direction.

In one embodiment, the adjuster is a telescopic rod connected to the other end portion of each of the injection pull rods and extending in the same direction as the injection pull rod, specifically, the telescopic rod is an injection base oil cylinder, and under drive of the injection base oil cylinder, and by the setting positions of the first and second rod sleeves, the adjustment of the injection position is achieved until two sides of the injection tail plate fit between the tail pillar and the first rod sleeve, and the two sides of the second rod sleeve fit between the head pillar and the injection head plate.

The specific injection process is as follows:
Injection: the servo motor and the energy accumulator work together to drive the ball screw to rotate clockwise, pushing the injection second plate and the screw rod forward, at this moment, the feeding belt suffers backstop of a one-way bearing and is held stationary (keeping the screw rod from rotating).

Holding pressure: the servo motor and the energy accumulator work together to maintain a certain pressure.
Feeding:
(1): the servo motor rotates counterclockwise, at this moment, the jaw clutch is in a disengaged state, and the one-way clutch backstops to work and drives the screw rod to rotate in place for feeding, and as the feeding action continues, the material at the front end of the screw rod accumulates more and more, generating increasing pressure, and the pressure sensed by the pressure sensor also increases;
(2): when the pressure sensed by the pressure sensor is greater than a setting value, the rodless cavities of the injection auxiliary oil cylinders unload oil through the proportional throttle valve, reducing the backward pressure of the screw rod, at this moment, the rods of the oil cylinders retract, the ball screw is driven to rotate counterclockwise, causing the screw rod to retract. When the pressure sensed by the pressure sensor is less than the setting value, the unloading amount of the proportional throttle valve is reduced, and Feeding (1) and Feeding (2) are repeated until the screw rod reaches the next initial injection position, completing the feeding action.

Backward loosening (anti flow-casting): the jaw clutch and the one-way clutch are in the disengaged state, the servo motor is not working, the rod cavities of the injection auxiliary oil cylinders are filled with oil through the oil circuit of a hydraulic servo system, the ball screw rotates counterclockwise, and the screw rod (not rotating) and the injection second plate retract along a straight line.

In one embodiment, an injection head plate and an injection tail plate are arranged on the base, wherein the feeding barrel and the injection head plate are fixedly connected, the injection tail plate is slidably arranged on the base and capable of moving with the screw rod in its length direction, the power motor and the feeding unit are arranged on the injection tail plate, and the injection unit and the auxiliary oil cylinder are arranged on the injection head plate and the injection tail plate. In the two-plate arrangement, the installation of the power system has a compact structure, small volume, and easy implementation, and meanwhile, with the assistance of the auxiliary oil cylinder, it is convenient for the implementation of injection and processing, especially during injection, it can accelerate the injection speed of the screw rod at the moment the energy accumulator releases energy.

In one embodiment, the feeding power component comprises a feeding transmission shaft coaxial with the screw rod and fixedly connected to the rear end portion of the screw rod, and a feeding belt wheel fixed on the feeding transmission shaft, and the feeding transmission component comprises a feeding transmission wheel connected to the output shaft through the second clutch, and a feeding transmission belt connecting the feeding belt wheel to the feeding transmission wheel in a transmission manner, wherein the feeding transmission shaft crosses the injection tail plate and is rotatably arranged on the injection tail plate through bearings.

In one embodiment, the injection power component comprises two sets of transmission lead screws with centerlines parallel to the centerline of the screw rod and located on two opposite sides of the screw rod, and injection belt wheels with one being arranged at a lead screw end portion of each set of transmission lead screws that passing through the injection tail plate, and the injection transmission component comprises an injection transmission wheel connected to the output shaft through the first clutch, and an injection transmission belt connecting the injection transmission wheel to the two injection belt wheels in a transmission manner. In this way, even in the relatively independent arrangement of the feeding transmission wheel and the injection transmission wheel, the injection and feeding actions can be carried out under the operation of one power motor by coaxial the injection transmission wheel and the feeding transmission wheel.

In one embodiment, the two injection belt wheels and the injection transmission wheel are triangularly distributed, with the injection transmission wheel located on the inner side of the feeding transmission belt and the two injection belt wheels located between the feeding belt wheel and the injection tail plate. This makes the distribution space more reasonable.

In one embodiment, the injection unit further comprises an encoder located inside the injection transmission belt and matched with the injection belt wheels and/or the injection transmission belt, and a pressure sensor fixedly arranged on the injection tail plate and for the feeding transmission shaft to pass through.

In one embodiment, there are two auxiliary oil cylinders aligned with the transmission lead screws in an up-down direction, and under the instantaneous power provided by the energy accumulator, the synchronous movement of the two auxiliary oil cylinders ensures the speed and stability of the injection.

In one embodiment, in order to adjust the injection position (namely the distance between the nozzle and the mold), in this example, linear guide rails are arranged below the transmission lead screws, the injection head plate and the injection tail plate are slidably arranged on the linear guide rails at the bottom, and the same injection base oil cylinder as mentioned above are correspondingly arranged above each linear guide rail, and the position adjustment is achieved under the driving of the injection base oil cylinders.

In one embodiment, in the above description, the first clutch is a jaw clutch, the second clutch is a one-way clutch, both can be directly purchased in the market, and their principles will not be described here, which is also clear and implementable.

The specific injection process is as follows:

Injection: the servo motor and the energy accumulator work together to drive the ball screws to rotate clockwise, pushing the injection tail plate and the screw rod forward, at this moment, the feeding belt suffers backstop of a one-way bearing and is held stationary (keeping the screw rod from rotating).

Holding pressure: the servo motor and the energy accumulator work together to maintain a certain pressure.

Feeding:
(1): the servo motor rotates counterclockwise, at this moment, the jaw clutch is in a disengaged state, and the backstop of the one-way clutch works and drives the screw rod to rotate in place for feeding, and as the feeding action continues, the material at the front end of the screw rod accumulates more and more, generating increasing pressure, and the pressure sensed by the pressure sensor also increases;
(2): when the pressure sensed by the pressure sensor is greater than a setting value, the rodless cavities of the injection auxiliary oil cylinders unload oil through the proportional throttle valve, reducing the backward pressure of the screw rod, at this moment, the rods of the oil cylinders retract, the ball screw is driven to rotate counterclockwise, causing the screw rod to retract. When the pressure sensed by the pressure sensor is less than the setting value, the unloading amount of the proportional throttle valve is reduced, and Feeding (1) and Feeding (2) are repeated until the screw rod reaches the next initial injection position, completing the feeding action.

Backward loosening (anti flow-casting): the jaw clutch and the one-way clutch are in the disengaged state, the servo motor is not working, the rod cavities of the injection auxiliary oil cylinders are filled with oil through the oil circuit of a hydraulic servo system, the ball screw rotates counterclockwise, and the screw rod (not rotating) and the injection tail plate retract in a straight line.

On the one hand, the present disclosure utilizes a dual clutch combination with coaxial arrangement to enable the use of the same motor for injection and feeding, thereby reducing the selection specifications of the motor; on the other hand, through the use of auxiliary oil cylinders, under the oil-electricity hybrid power, the pressure, speed, and accuracy of the injection can be ensured, especially during injection, and meanwhile, the high-precision movement of the screw rod can be achieved through the control of oil pressure during the backward loosening and back pressure actions, the present disclosure has a simple structure and is convenient for implementation.

Reference numbers are as below: 1—base; 10—injection table; 11—pillar; x—linear guide rail; 2—feeding barrel; 20—barrel body; 21—nozzle; 20a—plastic raw material inlet; 3—screw rod; 4—power system; 40—power motor (servo motor); 400—output shaft; 41—injection unit; 410—injection power component; e—injection transmission shaft; f—injection belt wheel; g—transmission lead screw; h—fixed plate; 411—injection transmission component; i—injection transmission wheel; j—injection transmission belt; 412—first clutch (jaw clutch); 413—encoder; 414—pressure sensor; 42—feeding unit; 420—feeding power component; a—feeding transmission shaft; b—feeding belt wheel; 421—feeding transmission component; c—feeding transmission wheel; d—feeding transmission belt; 422—second clutch (one-way clutch); 43—oil pressure auxiliary unit; 430—auxiliary oil cylinder; 431—energy accumulator; t1—first rod sleeve; t2—second rod sleeve; t3—adjuster; t30—injection base oil cylinder; 5—injection pull rod; 6—injection head plate; 7—injection second plate; 8—injection tail plate.

DETAILED DESCRIPTION

Embodiment 1

Figure 1:
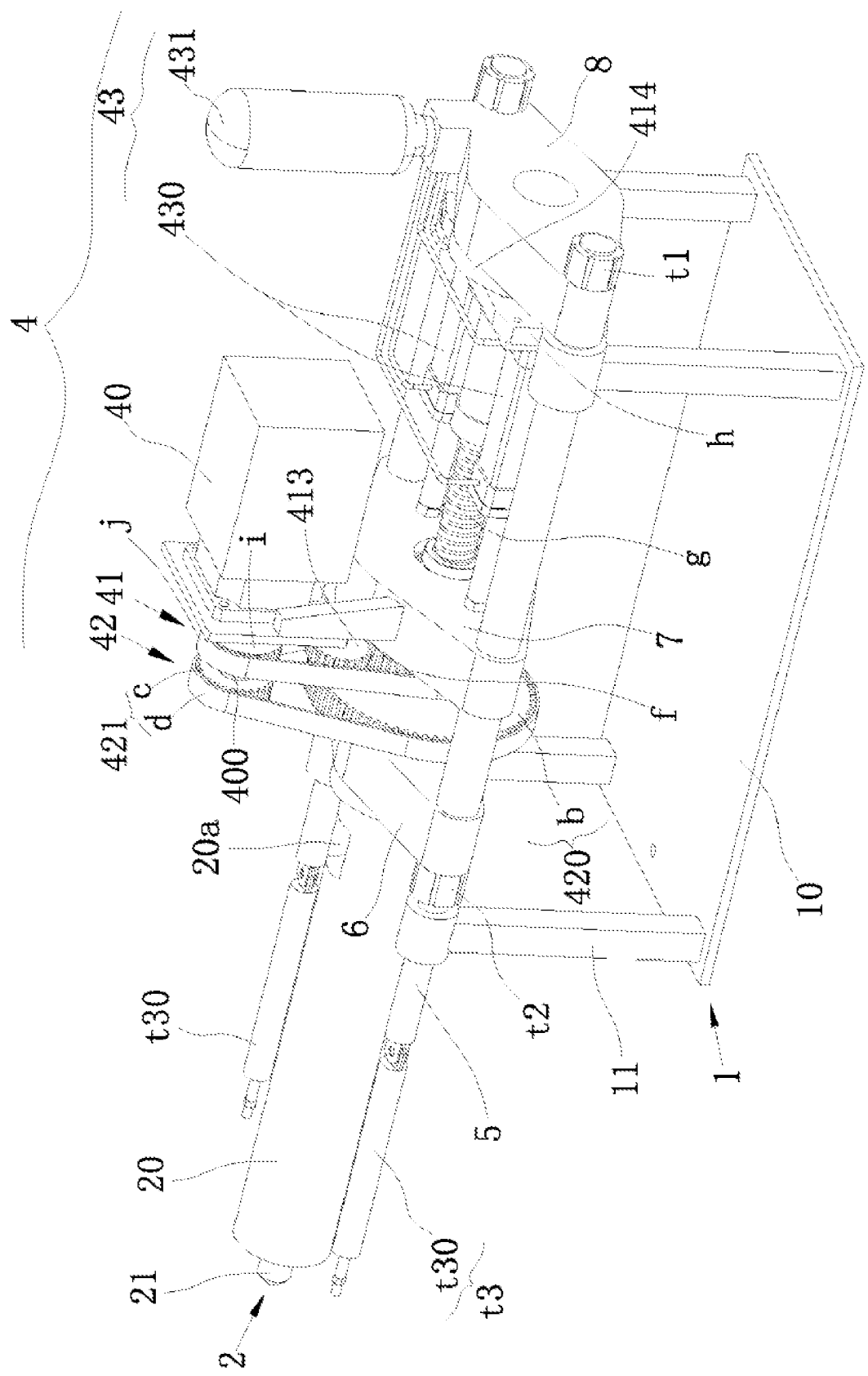
FIG. 1 is a schematic structure diagram of the oil-electricity hybrid injection molding machine with three plates in Embodiment 1.

As shown in FIG. 1, an oil-electricity hybrid injection molding machine with three plates in this embodiment comprises a base 1, a feeding barrel 2, a screw rod 3, and a power system 4.

Specifically, the base 1 comprises an injection table 10 and pillars 11 located on the injection table 10, wherein the injection table 10 is square, with four pillars 11 correspondingly distributed at the four corners of the injection table 10, and the power system 4 is arranged on the pillars 11 through two injection pull rods 5 extending along the length direction of the screw rod 3.

In this embodiment, each of the two injection pull rods 5 passes through two pillars 11 located on the same side.

The feeding barrel 2 comprises a barrel body 20 with a feeding cavity formed internally and a nozzle 21 arranged at the front end portion of the barrel body 20, wherein the barrel body 20 is provided with a plastic raw material inlet 20a.

The screw rod 3 extends along the length direction of the feeding barrel 2 and is arranged with a rear end portion exposed out of the barrel body 20.

The power system 4 is mainly used to drive the screw rod 3 to rotate around its axis and/or move rectilinearly along its length direction.

Figure 2:
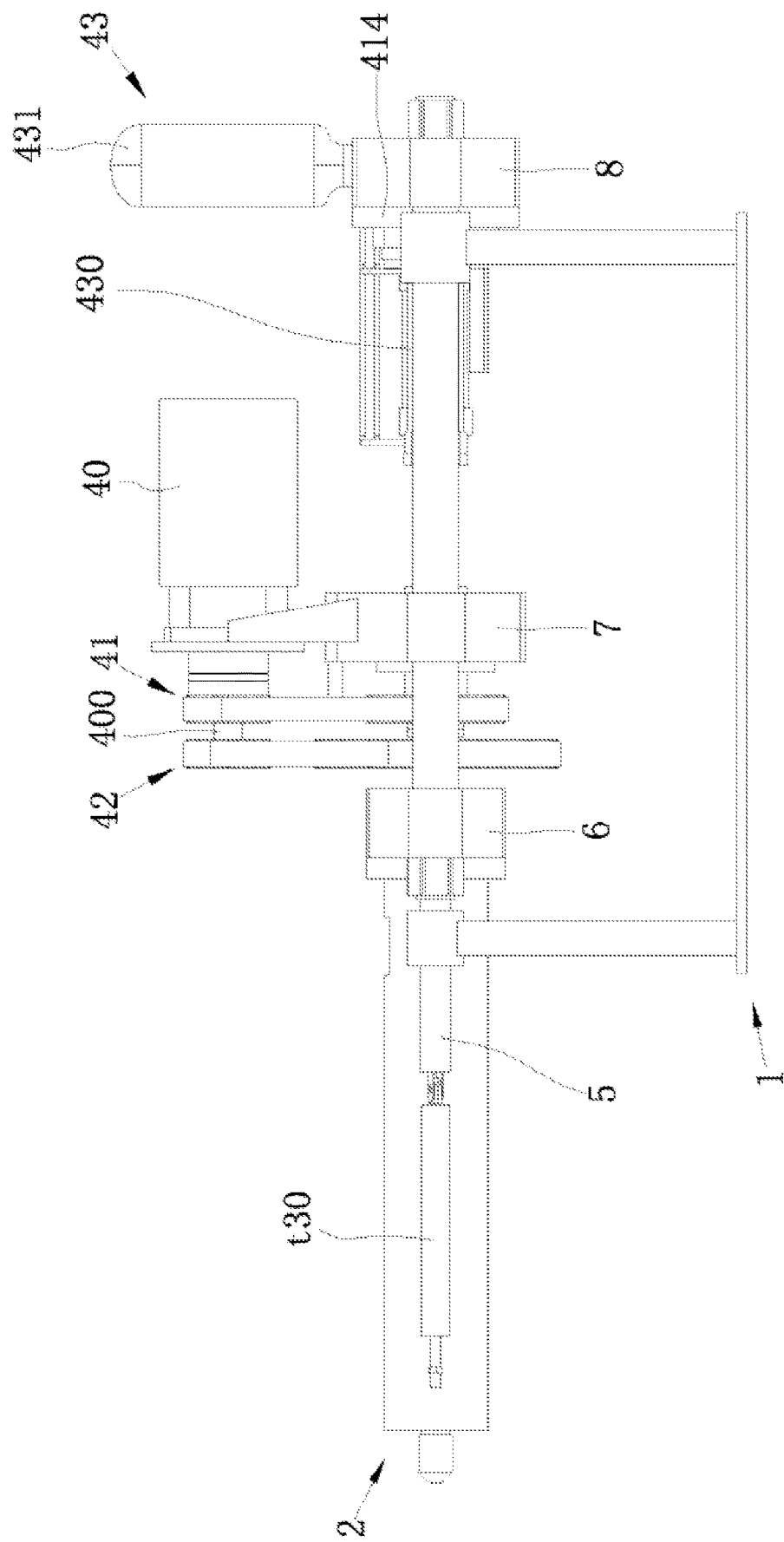
FIG. 2 is a schematic front view of FIG. 1.

As shown in FIG. 2, an injection head plate 6, an injection second plate 7, and an injection tail plate 8 are sequentially arranged on the injection pull rods 5 from front to rear, wherein the barrel body 20 is fixed to the injection head plate 6 at the rear end portion, the injection head plate 6 and the injection tail plate 8 are fixed on the injection pull rods 5, and the injection second plate 7 is located between the injection head plate 6 and the injection tail plate 8, and is slidably arranged on the injection pull rods 5.

The power system 4 comprises a power motor 40 with an output shaft 400 parallel to the screw rod 3, an injection unit 41, a feeding unit 42, and an oil pressure auxiliary unit 43.

Figure 3:
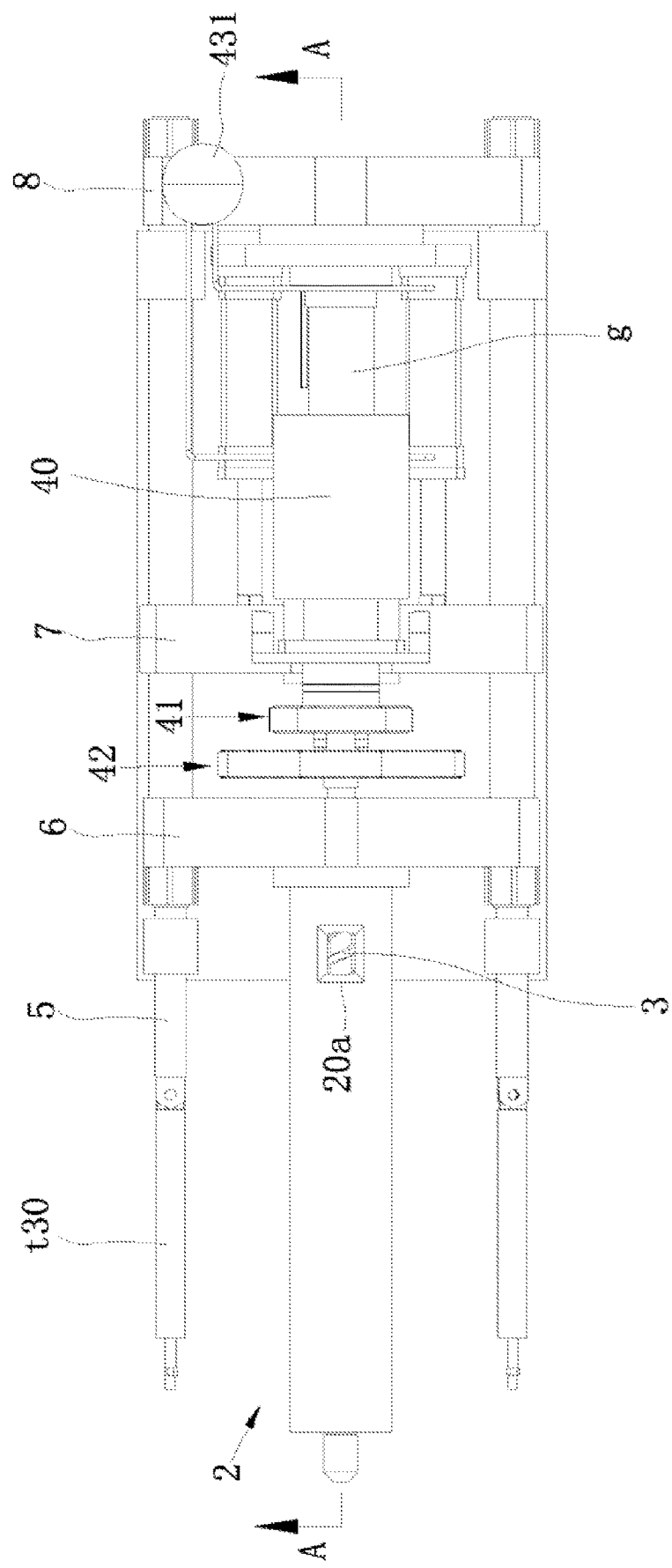
FIG. 3 is a schematic left view of FIG. 1.

As shown in FIG. 3, the power motor 40, the injection unit 41 and the feeding unit 42 are arranged on the injection second plate 7, and the oil pressure auxiliary unit 43 is arranged between the injection second plate 7 and the injection tail plate 8.

Specifically, the power motor is a common servo motor, and is fixed on the injection second plate 7 through a frame base, wherein the output shaft 400 is located between the injection head plate 6 and the injection second plate 7, and at the top of the injection second plate 7.

Figure 4:
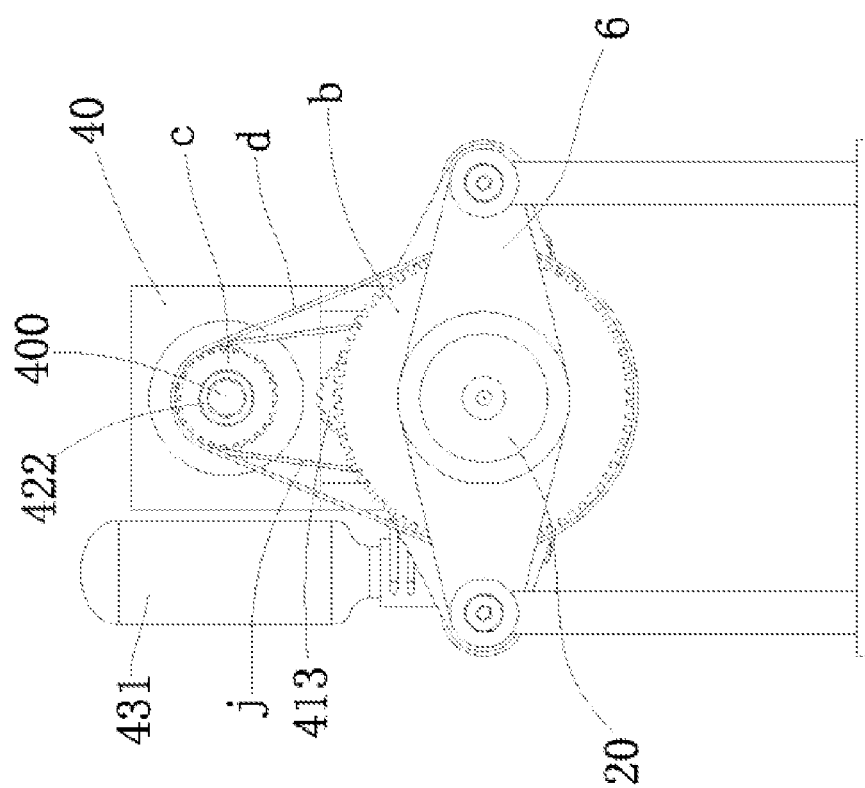
FIG. 4 is a schematic top view of FIG. 1.
Figure 5:
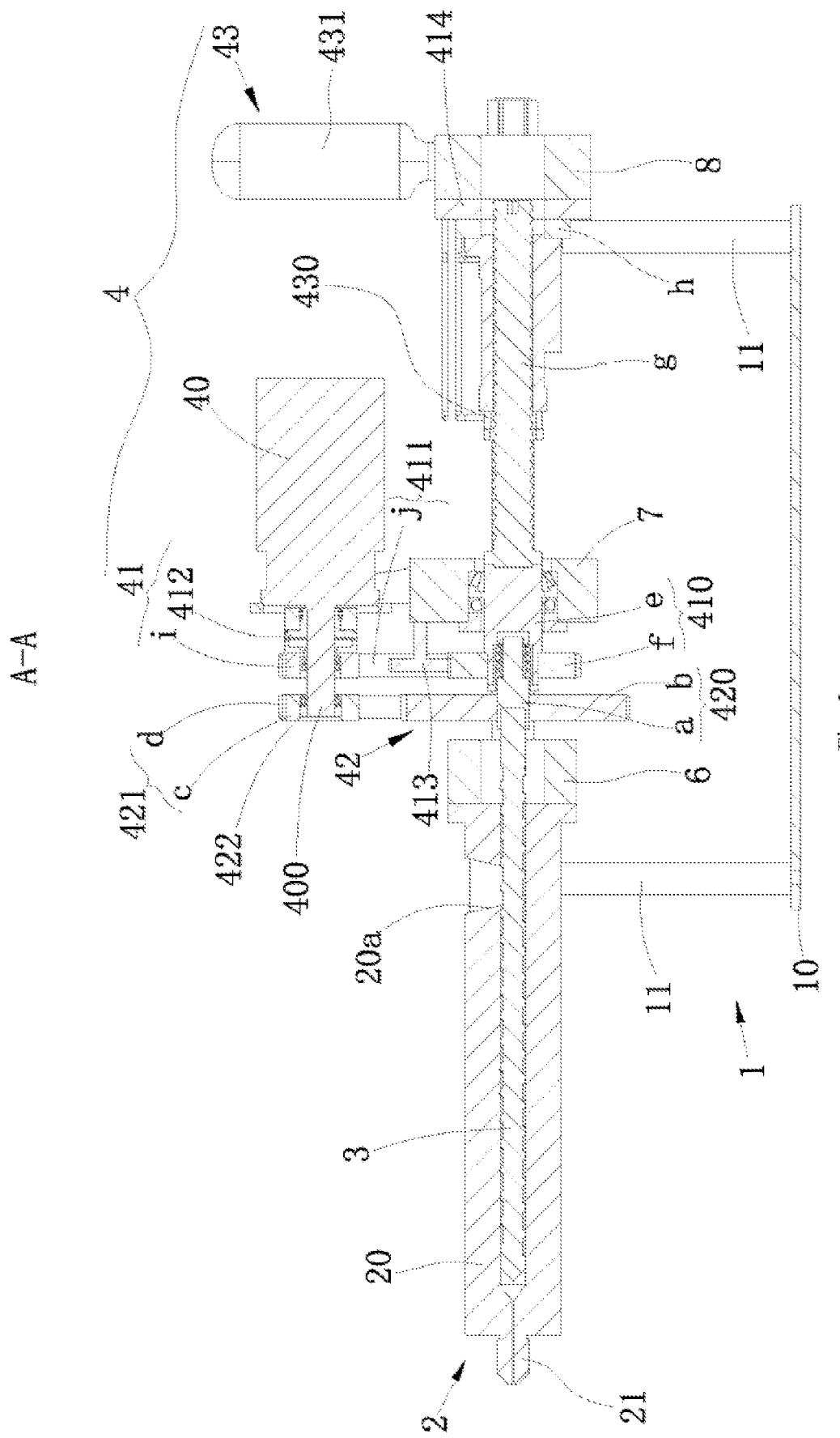
FIG. 5 is a schematic cross-sectional view along Line A-A in FIG. 4.

As shown in FIG. 4 and FIG. 5, the injection unit 41 comprises an injection power component 410 capable of pushing the screw rod 3 to move along its length direction, an injection transmission component 411 connecting the injection power component 410 to the output shaft 400 in a transmission manner, and the first clutch 412 arranged on the output shaft 400 and capable of disengaging and engaging the output shaft 400 and the injection transmission component 411.

The feeding unit 42 comprises a feeding power component 420 connected to the output shaft 400 in a transmission manner and capable of driving the screw rod 3 to rotate, a feeding transmission component 421 connecting the feeding power component 420 to the output shaft 400 in a transmission manner, and the second clutch 422 arranged on the output shaft 400 and capable of disengaging and engaging the output shaft 400 and the feeding transmission component 421.

The oil pressure auxiliary unit 43 comprises an auxiliary oil cylinder 430 arranged parallel to the screw rod 3, wherein the auxiliary oil cylinder 430 is arranged between the injection second plate 7 and the injection tail plate 8.

In this embodiment, the injection power component 410 and the feeding power component 420 share a power motor 40, and the first clutch 412 and the second clutch 422 are arranged on the output shaft 400 at interval.

Specifically, the feeding power component 420 comprises a feeding transmission shaft a coaxial with the screw rod 3 and fixedly connected to the rear end portion of the screw rod 3, and a feeding belt wheel b fixed on the feeding transmission shaft a, and the feeding transmission component 421 comprises a feeding transmission wheel c connected to the output shaft 400 through the second clutch 422, and a feeding transmission belt d connecting the feeding belt wheel b to the feeding transmission wheel c in a transmission manner. By synchronizing the feeding belt pulley and the screw rod, it is convenient to accurately control the screw rod state during feeding.

The injection power component 410 comprises an injection transmission shaft e coaxial with and rotatably connected to the feeding transmission shaft a, an injection belt wheel f fixed on the injection transmission shaft e, and a transmission lead screw g fixedly connected to the injection transmission shaft e, wherein the injection transmission shaft e passes through the injection second plate 7 and is rotatably arranged relative to the injection second plate 7, and the transmission lead screw g is connected to the injection tail plate 8 via a fixed plate h.

The injection transmission component 411 comprises an injection transmission wheel i connected to the output shaft 400 through the first clutch 412, and an injection transmission belt j connecting the injection transmission wheel i to the injection belt wheel fin a transmission manner.

Therefore, the coaxial connection between the feeding transmission shaft a, the injection transmission shaft e, and the screw rod 3 realizes the relative rotation of the feeding belt wheel b and the injection belt wheel f.

The injection unit 41 further comprises an encoder 413 located inside the injection transmission belt j and capable of synchronously moving with the injection belt wheel f, and a pressure sensor 414 arranged between the fixed plate h and the injection tail plate 8.

Specifically, the injection belt wheel f, the injection transmission wheel i, and the encoder 413 are toothed wheels, the injection transmission belt j is a tooth-and-slot belt, wherein the encoder 413 is engaged with the injection belt wheel f. In this way, in the configuration of encoder 413, the movement status of the screw rod 3 can be accurately controlled to facilitate the control of injection accuracy.

Specifically, the pressure sensor 41 is mainly to obtain feedback on the pressure of the screw rod 3 during injection molding and adjust the injection process accordingly based on the feedback value.

Specifically, the feeding process is divided into:
Feeding (I): the servo motor rotates counterclockwise, at this moment, the first clutch (a jaw clutch) is in a disengaged state, and the second clutch (a one-way clutch) backstops to work and drives the screw rod to rotate in place for feeding, and as the feeding action continues, the material at the front end of the screw rod accumulates more and more, generating increasing pressure, and the pressure sensed by the pressure sensor also increases;
Feeding (II): when the pressure sensed by the pressure sensor is greater than a setting value, the rodless cavity of the auxiliary oil cylinder unloads oil through the proportional throttle valve, reducing the backward pressure of the screw rod, at this moment, the auxiliary oil cylinder retracts, the ball screw is driven to rotate counterclockwise, causing the screw rod to retract. When the pressure sensed by the pressure sensor is less than the setting value, the unloading amount of the proportional throttle valve is reduced, and Feeding (I) and Feeding (II) are repeated until the screw rod reaches the next initial injection position, completing the feeding action.

In addition, the oil pressure auxiliary unit 43 further comprises an energy accumulator 431 connected to the oil circuit of the auxiliary oil cylinder 430, wherein during injection, the energy accumulator 431 releases energy, and a rodless cavity of the auxiliary oil cylinder 430 is filled with oil. Under the instantaneous power provided by the energy accumulator, the synchronous movement of dual auxiliary oil cylinders ensures the speed of the injection.

Therefore, when the corresponding clutch states of the first clutch 412 and the second clutch 422 are switched, only one power motor 40 (a servo motor) can work to implement the injection molding of the screw rod 3, especially during injection molding, the maximum injection pressure is supplied by the servo motor and the auxiliary oil cylinder 430 simultaneously, therefore, the specification of the servo motor is smaller than that of the servo motor of the all-electric injection molding output shaft, which not only reduces the cost of motor specification selection, but also reduces injection molding costs.

Meanwhile, in order to meet the distance adjustment between the nozzle and the mold, for each of the injection pull rods 5, a first rod sleeve t1 is formed at one end portion thereof, a second rod sleeve t2 is formed on the injection pull rod 5 between two pillars 11 on the same side, and an adjuster t3 is provided to drive the injection pull rod 5 to move along its length direction.

In this embodiment, the adjuster t3 is a telescopic rod connected to the other end portion of the injection pull rod 5 and extending in the same direction as the injection pull rod 5.

Specifically, the telescopic rod is an injection base oil cylinder t30, and under drive of the injection base oil cylinder t30, and by the setting positions of the first rod sleeve t1 and second rod sleeve t2, the adjustment of the injection position is achieved until two sides of the injection tail plate 8 fit between the tail pillar 11 and the first rod sleeve t1, and the two sides of the second rod sleeve t2 fit between the head pillar 11 and the injection head plate 6.

Moreover, the first clutch 412 is a jaw clutch, the second clutch 422 is a one-way clutch, and both can be directly purchased in the market, specifically:
the one-way clutch: one-way deep groove ball bearing, also known as one-way clutch, can only transmit in one direction, when the power source drives a passive component, it only transmits in one direction, and if the power source changes direction (such as clockwise to counterclockwise), the transmission power to the passive component will stop;
the jaw clutch: it is composed of two semi-clutches with teeth on the end faces, the semi-clutch I is fixed on the driving shaft, and the semi-clutch II is connected to the driven shaft by a feather key (or spline), and the sliding block is moved axially by the control mechanism to play a clutch role.

In summary, the injection molding process of the injection molding machine in this embodiment is as follows:
Injection: the servo motor and the energy accumulator work together, the jaw clutch is in an engaged state, the one-way clutch is disengaged, at this moment, the injection belt wheel drives the ball screw to rotate clockwise, pushing the injection second plate and the screw rod forward, at this moment, the feeding belt suffers backstop of a one-way bearing and is held stationary (keeping the screw rod from rotating).

Holding pressure: the servo motor and the energy accumulator work together to maintain a certain pressure.

Feeding (divided into the following processes): (1), the servo motor rotates counterclockwise, at this moment, the jaw clutch is in the disengaged state, and the one-way clutch backstops to work, the feeding belt wheel drives the screw rod to rotate in place for feeding, and as the feeding action continues, the material at the front end of the screw rod accumulates more and more, generating increasing pressure, and the pressure sensed by the pressure sensor also increases; (2), when the pressure sensed by the pressure sensor is greater than a setting value, the rodless cavity of the auxiliary oil cylinder unloads oil through the proportional throttle valve, reducing the backward pressure of the screw rod, at this moment, the auxiliary oil cylinder retracts, the ball screw is driven to rotate counterclockwise, causing the screw rod to retract. When the pressure sensed by the pressure sensor is less than the setting value, the unloading amount of the proportional throttle valve is reduced, and Feeding (1) and Feeding (2) are repeated until the screw rod reaches the next initial injection position, completing the feeding action.

Backward loosening (anti flow-casting): the jaw clutch and the one-way clutch are in the disengaged state, the servo motor is not working, the rod cavities of the injection auxiliary oil cylinders are filled with oil through the oil circuit of a hydraulic servo system, the ball screw rotates counterclockwise, and the screw rod (not rotating) and the injection second plate retract in a straight line.

Embodiment 2

As shown in FIG. 5, compared with Embodiment 1, the oil-electricity hybrid injection molding machine with two plates of this embodiment is the same in the basic structure and implementation principle, and differs in that there are only an injection head plate 6 and an injection tail plate 8, and in the implementation method of the power system 4.

Figure 6:
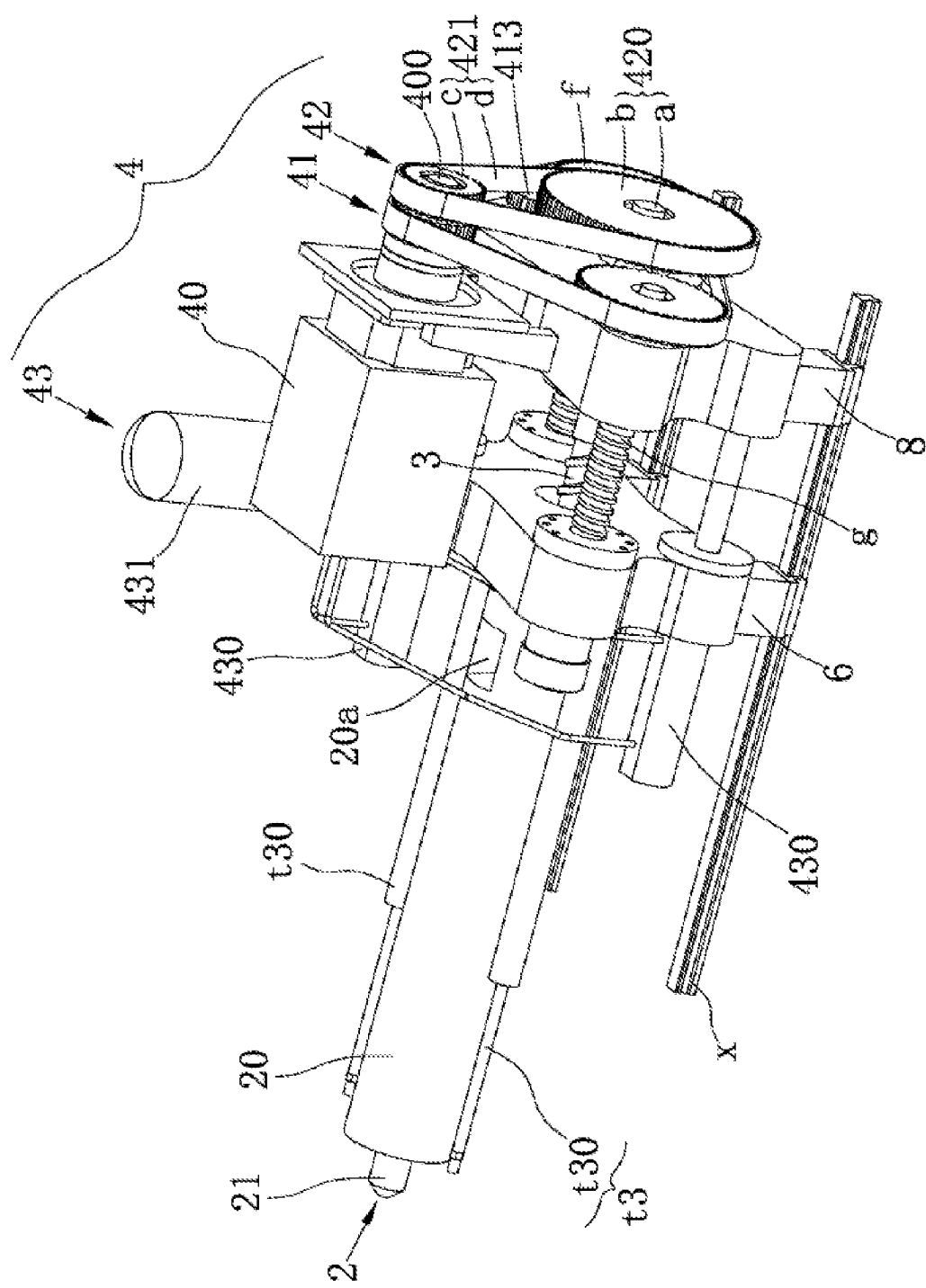
FIG. 6 is a schematic structure diagram of the oil-electricity hybrid injection molding machine with two plates in Embodiment 2.

As shown in FIG. 6, the barrel body 20 is fixedly connected to the injection head plate 6 at the rear end portion, the injection tail plate 8 is slidably arranged on the base 1 in a manner that moves in its length direction along with the screw rod 3, the power motor 40 and the feeding unit 42 are arranged on the injection tail plate 8, and the injection unit 41 and the auxiliary oil cylinder 430 are arranged between the injection head plate 6 and the injection tail plate 8. In the two-plates arrangement, the installation of the power system has a compact structure, small volume, and easy implementation, and meanwhile, with the assistance of the auxiliary oil cylinder, it is convenient for the implementation of injection and processing, especially during injection, it can accelerate the injection speed of the screw rod at the moment the energy accumulator releases energy.

Figure 7:
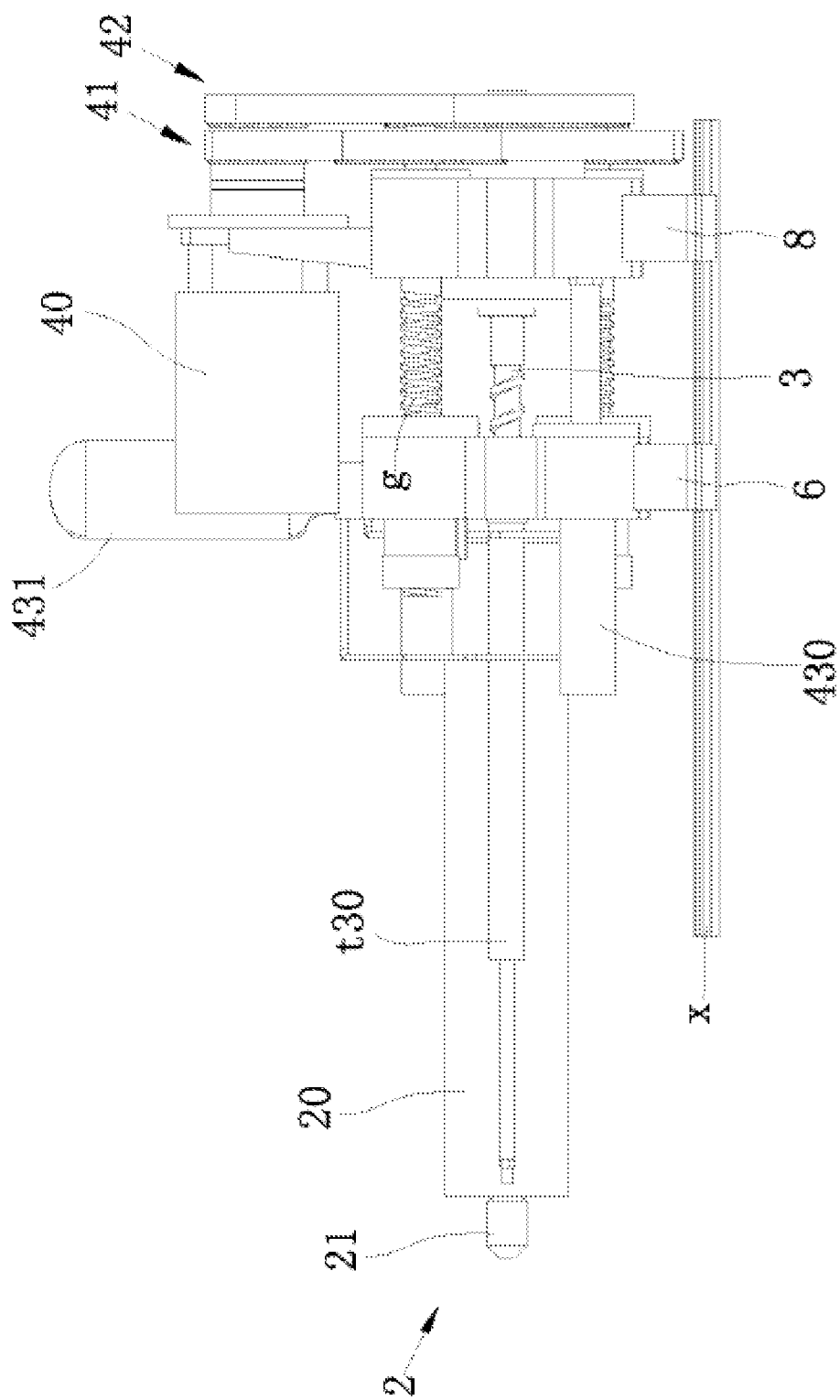
FIG. 7 is a schematic front view of FIG. 6.

As shown in FIG. 7, the feeding power component 420 comprises a feeding transmission shaft a coaxial with the screw rod 3 and fixedly connected to the rear end portion of the screw rod 3, and a feeding belt wheel b fixed on the feeding transmission shaft a, and the feeding transmission component 421 comprises a feeding transmission wheel c connected to the output shaft 400 through the second clutch 422, and a feeding transmission belt d connecting the feeding belt wheel b to the feeding transmission wheel c in a transmission manner. By synchronizing the feeding belt pulley and the screw rod, it is convenient to accurately control the screw rod state during feeding.

The injection power component 410 comprises two sets of transmission lead screws g with centerlines parallel to the centerline of the screw rod 3 and located on two opposite sides of the screw rod 3, and injection belt wheels f with one being arranged at the screw end portion of each set of transmission lead screws g passing through the injection tail plate 8, and the injection transmission component 411 comprises an injection transmission wheel i connected to the output shaft 400 through the first clutch 412, and an injection transmission belt j connecting the injection transmission wheel i to the two injection belt wheels f in a transmission manner. In this way, even in the relatively independent arrangement of the feeding transmission wheel and the injection transmission wheel, the injection and feeding actions can be carried out under the operation of one power motor by coaxial the injection transmission wheel and the feeding transmission wheel.

To facilitate the assembly of the injection belt wheels f, injection transmission shafts e are fixedly connected to the end portions of the transmission lead screws g, and the injection belt wheels f are fixed on the injection transmission shafts e.

Figure 8:
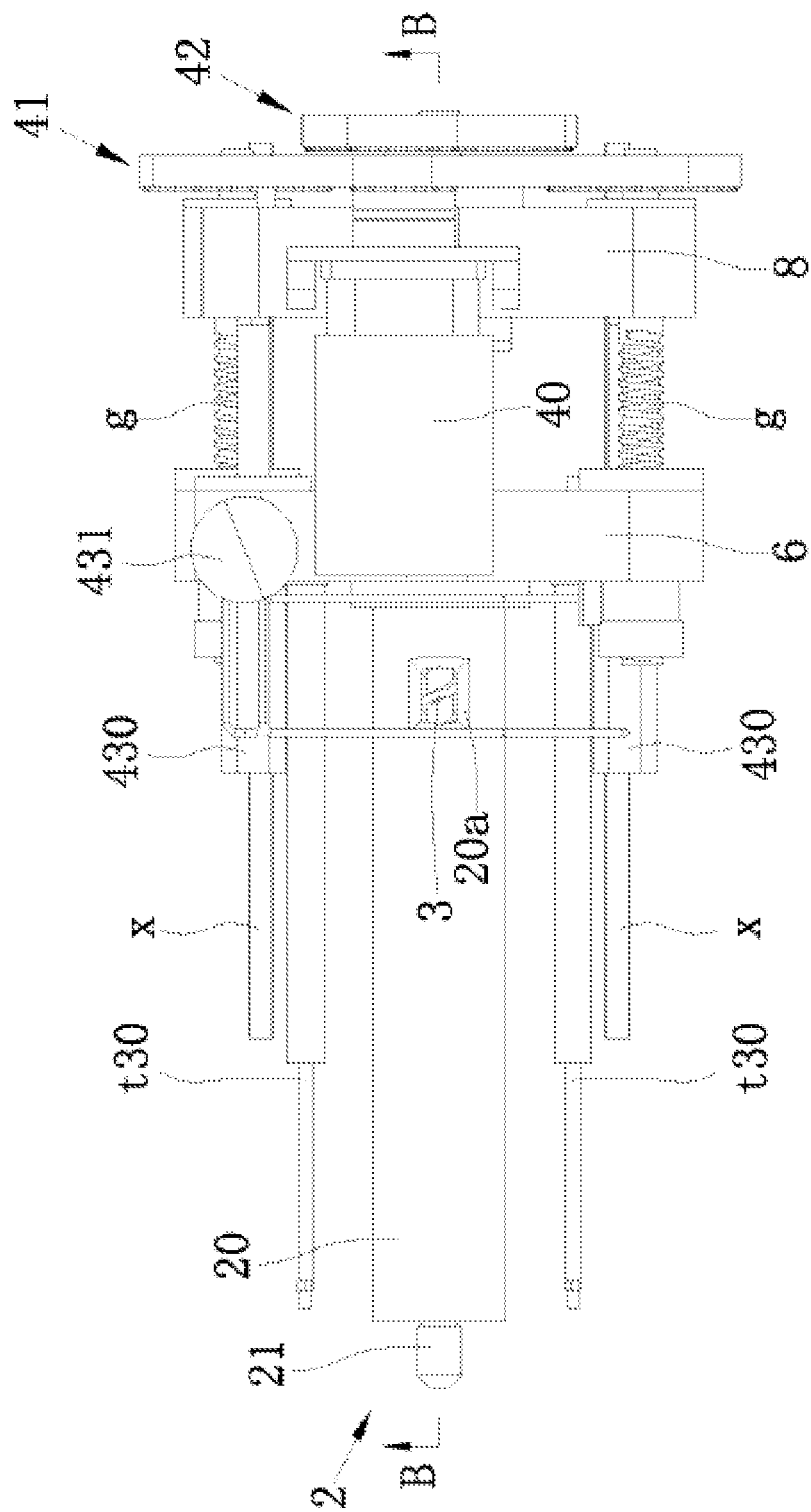
FIG. 8 is a schematic right view of FIG. 6.

As shown in FIG. 8, the two injection belt wheels f and the injection transmission wheel i are triangularly distributed, with the injection transmission wheel i located on the inner side of the feeding transmission belt c and the two injection belt wheels f located between the feeding belt wheel b and the injection tail plate 8.

Figure 9:
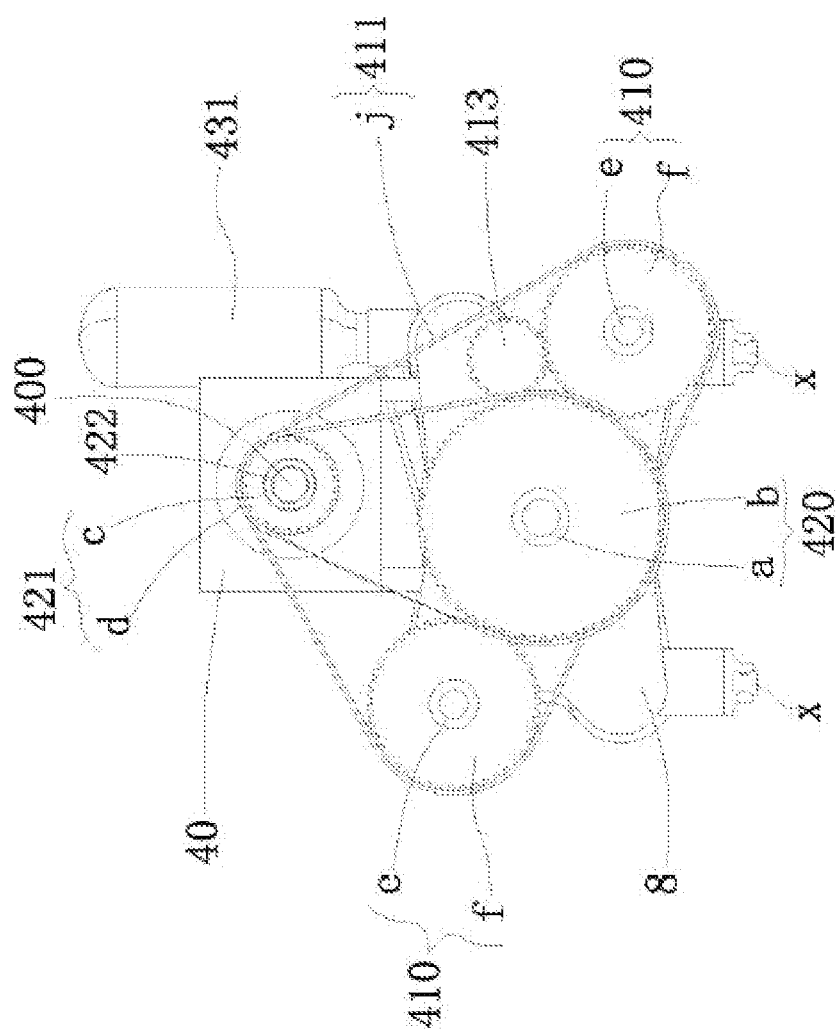
FIG. 9 is a schematic top view of FIG. 6.
Figure 10:
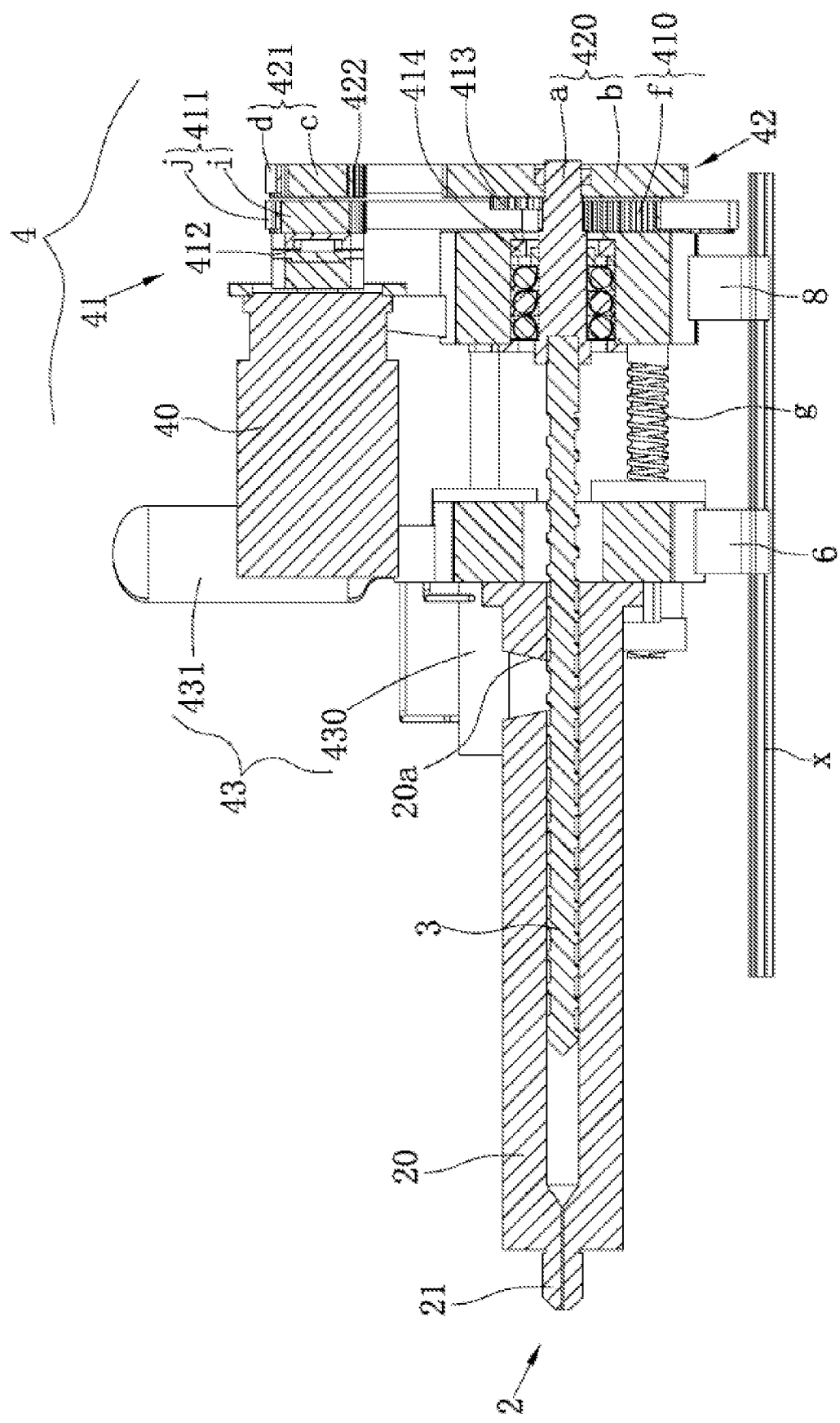
FIG. 10 is a schematic cross-sectional view along Line B-B in FIG. 9.

As shown in FIG. 9 and FIG. 10, the injection unit 41 further comprises an encoder 413 located inside the injection transmission belt j and synchronously moving with the injection belt wheels f, and a pressure sensor 414 fixedly arranged on the injection tail plate 8 and for the feeding transmission shaft a to pass through.

In this embodiment, the injection belt wheels f, the injection transmission wheel i, and the encoder 413 are toothed wheels, the injection transmission belt j is a tooth-and-slot belt, wherein the encoder 413 is engaged with the injection belt wheels f. In this way, in the configuration of the encoder 413, the movement status of the screw rod 3 can be accurately controlled to facilitate the control of injection accuracy.

Specifically, there are two auxiliary oil cylinders 430 aligned with the transmission lead screws g in an up-down direction, wherein the auxiliary oil cylinders 430 and the energy accumulator 431 are fixed on the injection head plate 6, and the transmission lead screws are common ball screw structures.

In addition, in order to adjust the injection position (namely the distance between the nozzle and the mold), in this embodiment, linear guide rails x are arranged below the transmission lead screws g, the injection head plate 6 and the injection tail plate 8 are slidably arranged on the linear guide rails x at bottom, and the same injection base oil cylinder t30 as mentioned above are correspondingly arranged above each linear guide rail x, and the position adjustment is achieved under the driving of the injection base oil cylinders t30.

Meanwhile, the injection molding process of this embodiment is as follows:

Injection: the servo motor and the energy accumulator work together, the jaw clutch is in an engaged state, the one-way clutch is disengaged, at this moment, the injection belt wheel drives the ball screws to rotate clockwise, pushing the injection tail plate and the screw rod forward, at this moment, the feeding belt suffers backstop of a one-way bearing and is held stationary (keeping the screw rod from rotating).

Holding pressure: the servo motor and the energy accumulator work together to maintain a certain pressure.

Feeding: (1), the servo motor rotates counterclockwise, at this moment, the jaw clutch is in the disengaged state, and the one-way clutch back stops to work, driving the screw rod to rotate in place for feeding, and as the feeding action continues, the material at the front end of the screw rod accumulates more and more, generating increasing pressure, and the pressure sensed by the pressure sensor also increases; (2), when the pressure sensed by the pressure sensor is greater than a setting value, the rodless cavities of the auxiliary oil cylinders unload oil through the proportional throttle valve, reducing the backward pressure of the screw rod, at this moment, the auxiliary oil cylinder rods retract, the ball screws are driven to rotate counterclockwise, causing the screw rod to retract. When the pressure sensed by the pressure sensor is less than the setting value, the unloading amount of the proportional throttle valve is reduced, and Feeding (1) and Feeding (2) are repeated until the screw rod reaches the next initial injection position, completing the feeding action.

Backward loosening (anti flow-casting): the jaw clutch and the one-way clutch are in the disengaged state, the servo motor is not working, the rod cavities of the injection auxiliary oil cylinders are filled with oil through the oil circuit of a hydraulic servo system, the ball screw rotates counterclockwise, and the screw rod (not rotating) and the injection tail plate retract in a straight line.

Therefore, the above embodiments of injection molding machines have the following advantages:

1, through the combined use of the one-way clutch and the jaw clutch, it enables the use of the same motor for injection and feeding, which not only reduces the selection specifications of the motor, but also reduces the injection molding costs;

2, through the use of the auxiliary oil cylinder and the energy accumulator, under the oil-electricity hybrid power formed by the auxiliary oil cylinder and the servo motor, the injection speed is ensured, especially during injection, and meanwhile, the high-precision movement of the screw rod can be achieved through the control of oil pressure during the backward loosening and back pressure actions, and the present disclosure has a simple structure and is convenient for implementation;

3. by the arrangement of the encoder, the position status of the screw rod can be recorded or accurately obtained, thus meeting the needs of high-precision injection molding; meanwhile, the feeding process is divided into feeding (I) and feeding (II) to ensure that the injection pressure meets the needs of injection molding.

The above detailed describes the present disclosure, and is intended to make those skilled in the art being able to understand the present disclosure and thereby implement it, and should not be concluded to limit the protective scope of this invention.

What is claimed is:

1. An oil-electricity hybrid injection molding machine, comprising:

a base;

a feeding barrel, comprising a barrel body with a feeding cavity internally and a nozzle arranged at a front end portion of the barrel body, with a plastic raw material inlet arranged on the barrel body;

a screw rod, extending along a length direction of the feeding barrel and with a rear end portion exposed out of the barrel body; and a power system, for driving the screw rod to rotate around its axis and/or move rectilinearly along its length direction, wherein, the power system comprises a power motor with an output shaft parallel to the screw rod, an injection unit and a feeding unit coaxially connected to the output shaft through a first clutch and a second clutch, respectively, and an oil pressure auxiliary unit, wherein the first clutch and the second clutch are arranged on the output shaft at interval, the oil pressure auxiliary unit comprises an auxiliary oil cylinder arranged parallel to the screw rod, and an energy accumulator connected to the auxiliary oil cylinder, and the injection unit is configured to drive the screw rod to move during injection, and the energy accumulator releases energy, and oil is filled into a rodless cavity of the auxiliary oil cylinder;

an injection head plate, an injection second plate and an injection tail plate are arranged on the base, wherein the feeding barrel and the injection head plate are fixedly connected, the injection second plate is slidably arranged on the base and capable of moving with the screw rod along the length direction of the screw rod, the power motor, the injection unit and the feeding unit are arranged on the injection second plate, and the auxiliary oil cylinder is arranged between the injection second plate and the injection tail plate;

two auxiliary oil cylinders are located on opposite sides of a centerline of the screw rod;

the base comprises an injection table and pillars located on the injection table, wherein the injection table is square, with four pillars distributed at four corners of the injection table, and the power system is arranged on the pillars through two injection pull rods extending along the length direction of the screw rod;

each of the two injection pull rods passes through two pillars located on the same side, the injection head plate, the injection tail plate, and the injection second plate are located between the two injection pull rods, each of the injection pull rods sequentially crosses the injection head plate, the injection second plate, and the injection tail plate on the same side, wherein the injection second plate is slidably arranged on the injection pull rods, and the injection head plate and the injection tail plate are positioned on the injection pull rods and are configured that a distance between the injection head plate and the injection tail plate remains unchanged; a first rod sleeve is arranged at one end portion of each of the injection pull rods, a second rod sleeve is arranged on the injection pull rod between two pillars on the same side, and an adjuster is provided to drive the injection pull rods to move along their length direction; the adjuster is a telescopic rod connected to the other end portion of each of the injection pull rods and extending in the same direction as the injection pull rod.

2. The oil-electricity hybrid injection molding machine according to claim 1, wherein the injection unit comprises an injection power component capable of pushing the screw rod to move along its length direction, an injection transmission component connecting the injection power component to the output shaft in a transmission manner, and the first clutch arranged on the output shaft and capable of disengaging and engaging the output shaft and the injection transmission component; the feeding unit comprises a feeding power component connected to the output shaft in a transmission manner and capable of driving the screw rod to rotate, a feeding transmission component connecting the feeding power component to the output shaft in a transmission manner, and the second clutch arranged on the output shaft and capable of disengaging and engaging the output shaft and the feeding transmission component.

3. The oil-electricity hybrid injection molding machine according to claim 2, wherein the feeding power component and the injection power component are arranged coaxially with the screw rod, and the feeding power component and the injection power component are rotatably arranged relative to each other.

4. The oil-electricity hybrid injection molding machine according to claim 2, wherein the feeding power component comprises a feeding transmission shaft coaxial with the screw rod and fixedly connected to the rear end portion of the screw rod, and a feeding belt wheel fixed on the feeding transmission shaft, and the feeding transmission component comprises a feeding transmission wheel connected to the output shaft through the second clutch, and a feeding transmission belt connecting the feeding belt wheel to the feeding transmission wheel in a transmission manner.

5. The oil-electricity hybrid injection molding machine according to claim 4, wherein the injection power component comprises an injection transmission shaft coaxial with and rotatably connected to the feeding transmission shaft, an injection belt wheel fixed on the injection transmission shaft, and a transmission lead screw fixedly connected to the injection transmission shaft, wherein the injection transmission shaft passes through the injection second plate and is rotatably arranged relative to the injection second plate, and the transmission lead screw is connected to the injection tail plate via a fixed plate.

6. The oil-electricity hybrid injection molding machine according to claim 5, wherein the injection transmission component comprises an injection transmission wheel connected to the output shaft through the first clutch, and an injection transmission belt connecting the injection transmission wheel to the injection belt wheel in a transmission manner.

7. The oil-electricity hybrid injection molding machine according to claim 6, wherein the injection unit further comprises an encoder located inside the injection transmission belt and matched with the injection belt wheel and/or the injection transmission belt, and a pressure sensor arranged between the fixed plate and the injection tail plate.

8. An oil-electricity hybrid injection molding machine, comprising:
  a base;
  a feeding barrel, comprising a barrel body with a feeding cavity internally and a nozzle arranged at a front end portion of the barrel body, with a plastic raw material inlet arranged on the barrel body:
  a screw rod, extending along a length direction of the feeding barrel and with a rear end portion exposed out of the barrel body; and
  a power system, for driving the screw rod to rotate around its axis and/or move rectilinearly along its length direction,
  wherein, the power system comprises a power motor with an output shaft parallel to the screw rod, an injection unit and a feeding unit coaxially connected to the output shaft through a first clutch and a second clutch, respectively, and an oil pressure auxiliary unit, wherein the first clutch and the second clutch are arranged on the output shaft at interval, the oil pressure auxiliary unit comprises an auxiliary oil cylinder arranged parallel to the screw rod, and an energy accumulator connected to the auxiliary oil cylinder, and the injection unit is configured to drive the screw rod to move during injection, and the energy accumulator releases energy, and oil is filled into a rodless cavity of the auxiliary oil cylinder;
  an injection head plate and an injection tail plate are arranged on the base, wherein the feeding barrel and the injection head plate are fixedly connected, the injection tail plate is slidably arranged on the base and capable of moving with the screw rod in its length direction, the power motor and the feeding unit are arranged on the injection tail plate, and the injection unit and the auxiliary oil cylinder are arranged on the injection head plate and the injection tail plate;
  the feeding unit comprises a feeding power component comprising a feeding transmission shaft coaxial with the screw rod and fixedly connected to the rear end portion of the screw rod, and a feeding belt wheel fixed on the feeding transmission shaft, and a feeding transmission component comprises a feeding transmission wheel connected to the output shaft through the second clutch, and a feeding transmission belt connecting the feeding belt wheel to the feeding transmission wheel in a transmission manner;
  the feeding transmission shaft crosses the injection tail plate and is rotatably arranged on the injection tail plate through bearings;
  an injection power component comprises two sets of transmission lead screws with centerlines parallel to a centerline of the screw rod and located on two opposite sides of the screw rod, and two injection belt wheels arranged at a lead screw end portion of each set of transmission lead screws that passing through the injection tail plate, and an injection transmission component comprises an injection transmission wheel connected to the output shaft through the first clutch, and an injection transmission belt connecting the injection transmission wheel to the two injection belt wheels in a transmission manner.

9. The oil-electricity hybrid injection molding machine according to claim 8, wherein the injection unit further comprises an encoder located inside the injection transmission belt and matched with the two injection belt wheels and/or the injection transmission belt, and a pressure sensor fixedly arranged on the injection tail plate and for the feeding transmission shaft to pass through.

10. The oil-electricity hybrid injection molding machine according to claim 8, wherein the two injection belt wheels and the injection transmission wheel are triangularly distributed, with the injection transmission wheel located on an inner side of the feeding transmission belt and the two injection belt wheels located between the feeding belt wheel and the injection tail plate.

11. The oil-electricity hybrid injection molding machine according to claim 10, wherein there are two auxiliary oil cylinders aligned with the transmission lead screws in an up-down direction, and under an instantaneous power provided by the energy accumulator, the two auxiliary oil cylinders move synchronously to inject.

12. The oil-electricity hybrid injection molding machine according to claim 8, wherein linear guide rails are arranged below the transmission lead screws, the injection head plate and the injection tail plate are slidably arranged on the linear guide rails at bottom, and an injection base oil cylinder is correspondingly arranged above each of the linear guide rails, and a position adjustment is achieved under driving of the injection base oil cylinders.

13. The oil-electricity hybrid injection molding machine according to claim 8, wherein the first clutch is a jaw clutch, and the second clutch is a one-way clutch.

* * * * *